United States Patent
Ioja

(10) Patent No.: US 7,210,399 B2
(45) Date of Patent: May 1, 2007

(54) TWO-PART PISTON FOR AN INTERNAL COMBUSTION ENGINE

(75) Inventor: Valerian Ioja, Windsor (CA)

(73) Assignees: Mahle Technology, Inc., Farmington Hills, MI (US); Mahle International GmbH, Stuttgart (DE)

( * ) Notice: Subject to any disclaimer, the term of this patent is extended or adjusted under 35 U.S.C. 154(b) by 0 days.

(21) Appl. No.: 11/227,851

(22) Filed: Sep. 15, 2005

(65) Prior Publication Data

US 2007/0056441 A1    Mar. 15, 2007

(51) Int. Cl.
*F16J 1/06*     (2006.01)

(52) U.S. Cl. ....................................... 92/216

(58) Field of Classification Search ................. 92/215, 92/216

See application file for complete search history.

(56) References Cited

U.S. PATENT DOCUMENTS 4,180,027 A    12/1979 Taylor 4,440,069 A  *  4/1984 Holtzberg et al. ............ 92/224

FOREIGN PATENT DOCUMENTS

| DE | 35 42 800 | 5/1987 |
|---|---|---|
| DE | 36 02 266 | 7/1987 |
| DE | 38 32 159 | 6/1998 |
| DE | 100 49 786 | 5/2001 |
| EP | 0 238 146 | 9/1991 |
| GB | 140651 | 4/1920 |

* cited by examiner

*Primary Examiner*—F. Daniel Lopez
(74) *Attorney, Agent, or Firm*—Collard & Roe, P.C.

(57) ABSTRACT

A two-part piston for an internal combustion engine has a piston head and a piston skirt. The piston head has a piston crown on the underside of which at least two boss lands, each provided with a head boss and a head boss hole are connected. The piston skirt has at least two boss bodies, each provided with a skirt boss and a skirt boss hole. When the head and skirt are joined, the head boss holes and skirt boss holes are flush in relation to each other for accommodating a gudgeon pin. Each boss body has a recess in which the corresponding boss land is accommodated with the associated head boss so that the head boss hole and skirt boss hole are aligned flush relative to each other.

15 Claims, 5 Drawing Sheets

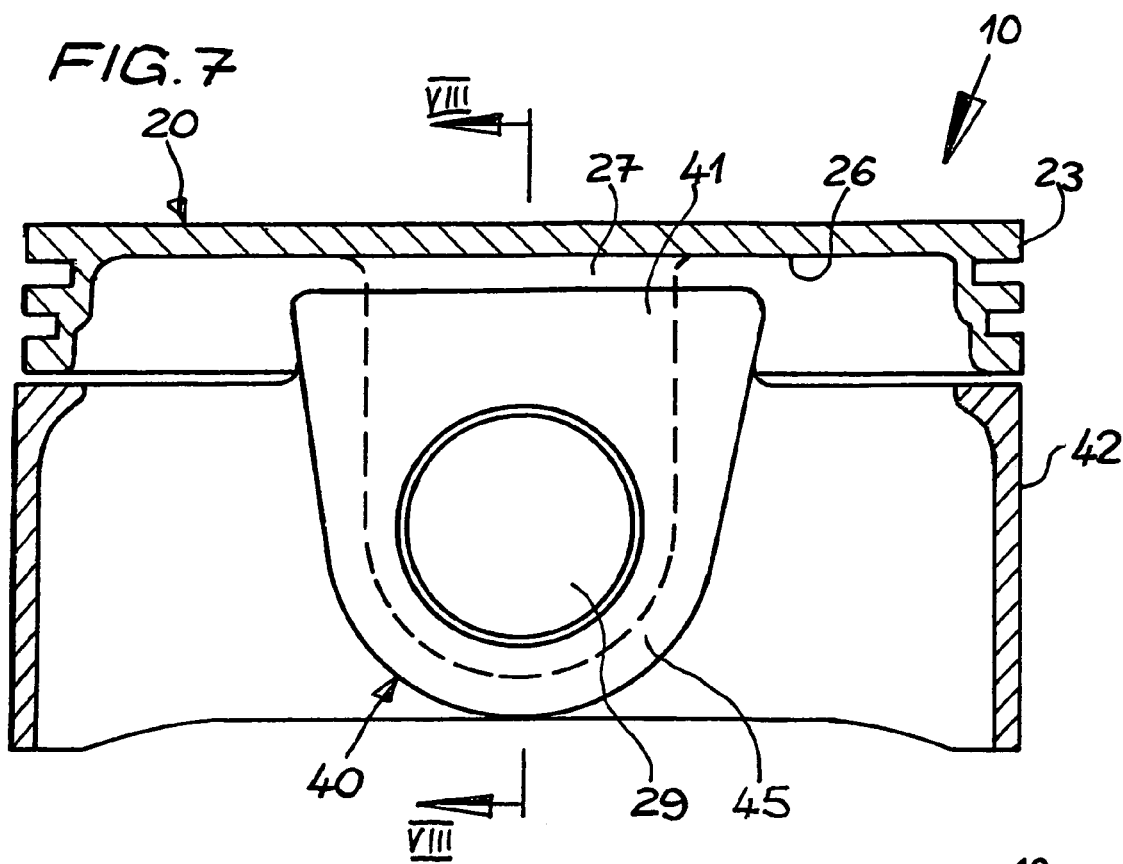
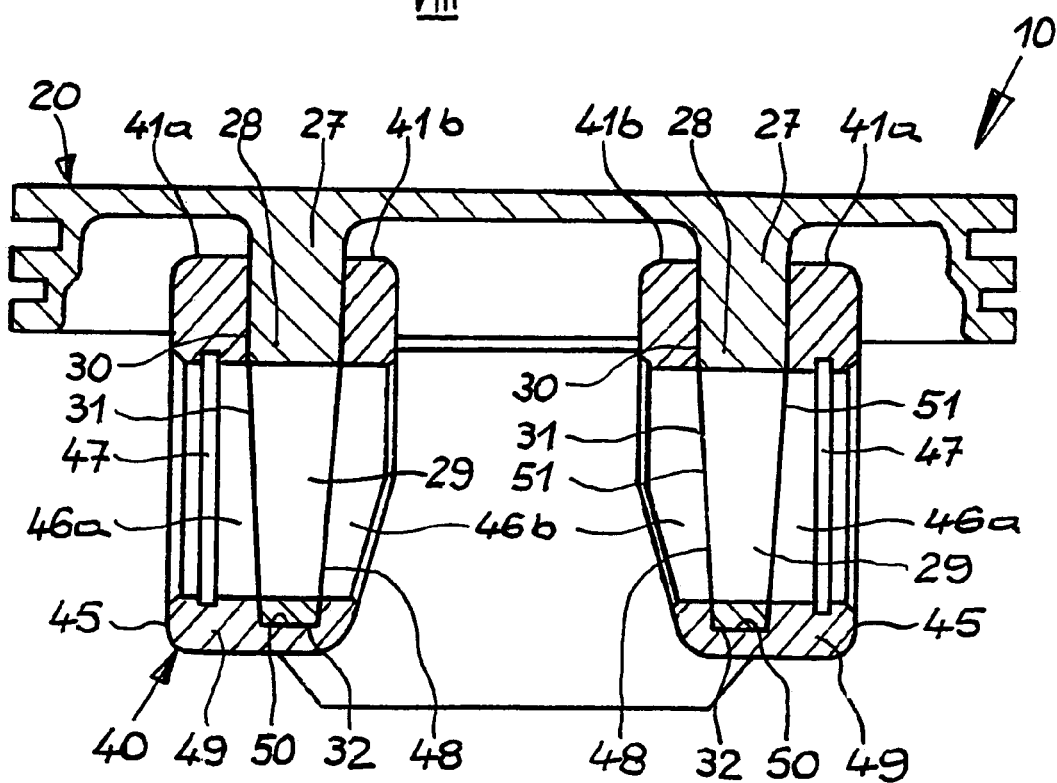

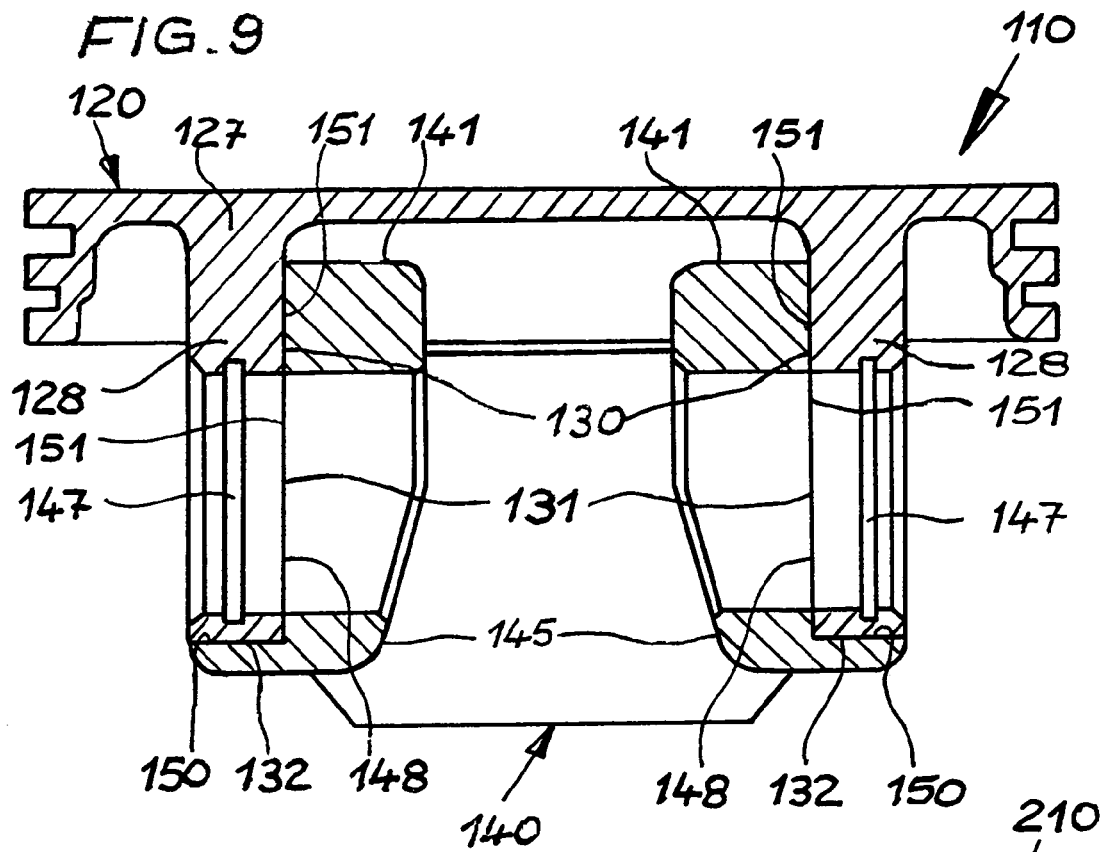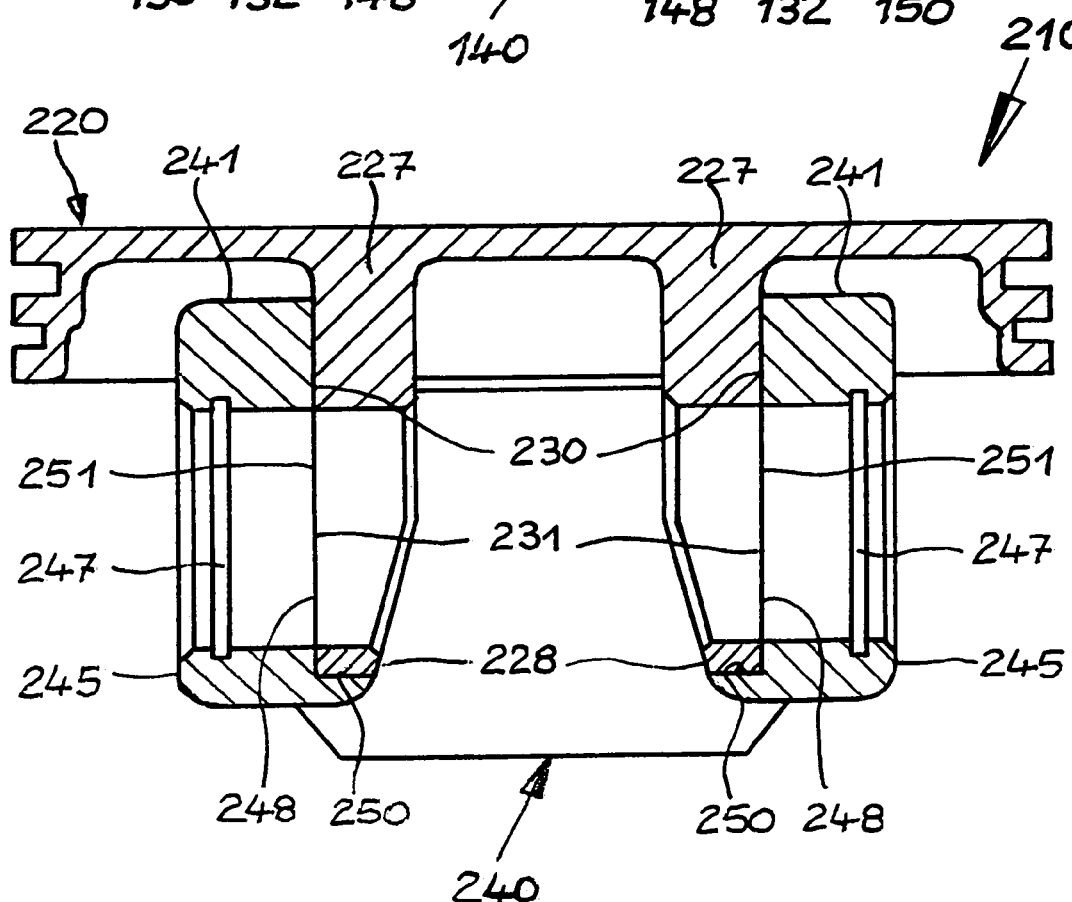

TWO-PART PISTON FOR AN INTERNAL COMBUSTION ENGINE

BACKGROUND OF THE INVENTION

1. Field of the Invention

The invention relates to a two-part piston for an internal combustion engine, comprising a piston head and a piston skirt, where the piston head features a piston crown, on the underside of which at least two boss lands, each provided with a head boss hole are connected. The piston skirt features at least two boss bodies each provided with a skirt boss hole. When assembled, the head boss holes and the skirt boss holes are flush relative to each other to accommodate a gudgeon pin.

2. The Prior Art

Generic pistons are described in U.S. Pat. No. 4,180,027 A, Great Britain Patent No. GB 140 651 A and German Patent No. DE 35 42 800 C1. Furthermore, comparable pistons are known from German Patent Nos. DE 100 49 786 A1, DE 38 32 159 C2, DE 36 02 266 A1 and European Patent No. EP 0 238 146 B1.

The common feature of the pistons described in these publications is that the piston head and the piston skirt are connected to each other merely by means of a gudgeon pin. To this end, both the piston head and the piston skirt have bosses which, when assembled, are provided with flush boss holes, through which the gudgeon pin is inserted. These types of pistons, in which the piston head and the piston skirt are joined to each other by means of the gudgeon pin, are also known as articulated-skirt pistons. The advantage of these types of pistons is that the piston head, which is subjected to greater stress by the temperatures and pressures in the adjoining combustion chamber, can be manufactured from a different material than that of the further removed piston skirt, which is subjected to less stress. For example, the piston head can be manufactured from steel and the piston skirt from an aluminum material. This approach is designed to limit damage, such as cracks and fractures, to the piston head. The disadvantage of these articulated-skirt pistons, however, is that it is comparatively awkward and complicated to assemble the piston head and piston skirt into the finished piston. In addition, a further aim of piston development is to further bring about a reduction in piston weight.

SUMMARY OF THE INVENTION

It is therefore an object of the invention to provide a generic piston that is simple to assemble and has reduced weight.

This task is solved according to the invention by a two-part piston for an internal combustion engine, comprising a piston head and a piston skirt, where the piston head features a piston crown, on the underside of which at least two boss lands, each provided with a head boss and a head boss hole are connected. The piston skirt features at least two boss bodies, each provided with a skirt boss and a skirt boss hole and where, when assembled, the head boss holes and the skirt boss holes are flush relative to each other to accommodate a gudgeon pin. The piston has the feature that each boss body features a recess, in which, when assembled, a boss land corresponding to the boss body is accommodated in such a way that the head boss hole and the skirt boss hole are aligned flush relative to each other.

This design according to the invention enables the boss lands on the underside of the piston head to be thinner and thereby saves materials and weight. The recesses on the boss bodies arranged on the piston skirt according to the invention likewise help to reduce materials and weight. In this way, the weight of the piston according to the invention is reduced compared to the known, state-of-the-art-technology piston. Furthermore, assembly of the piston head and piston skirt into the finished piston is simplified, since the boss lands can be easily inserted into the boss-body recesses.

Because the piston consists of two parts (the piston head and the piston skirt), the piston head exposed to high pressures and temperatures can be manufactured from a heat-resistant material, such as forged steel, while the piston skirt can be manufactured from a light material, such as aluminum or an aluminum alloy. In this way, the strength of the piston is significantly increased and its moving mass significantly reduced. This advantageously results in a greater load capability and a higher piston speed, features to which the lighter piston skirt also contributes. Furthermore, the compression height can be reduced, which improves the efficiency of the piston.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views:

FIG. 7 shows a sectional view of the piston head of FIG. 1 and the piston skirt of FIG. 3 when assembled;

FIG. 8 shows a sectional view of the piston head of FIG. 1 and the piston skirt of FIG. 3 when assembled along line VIII—VIII of FIG. 7;

FIG. 9 shows a sectional view of a further embodiment of a piston head and a piston skirt when assembled; and FIG. 10 shows a sectional view of a further embodiment of a piston head and a piston skirt when assembled.

DETAILED DESCRIPTION OF THE PREFERRED EMBODIMENT

Figure 1:
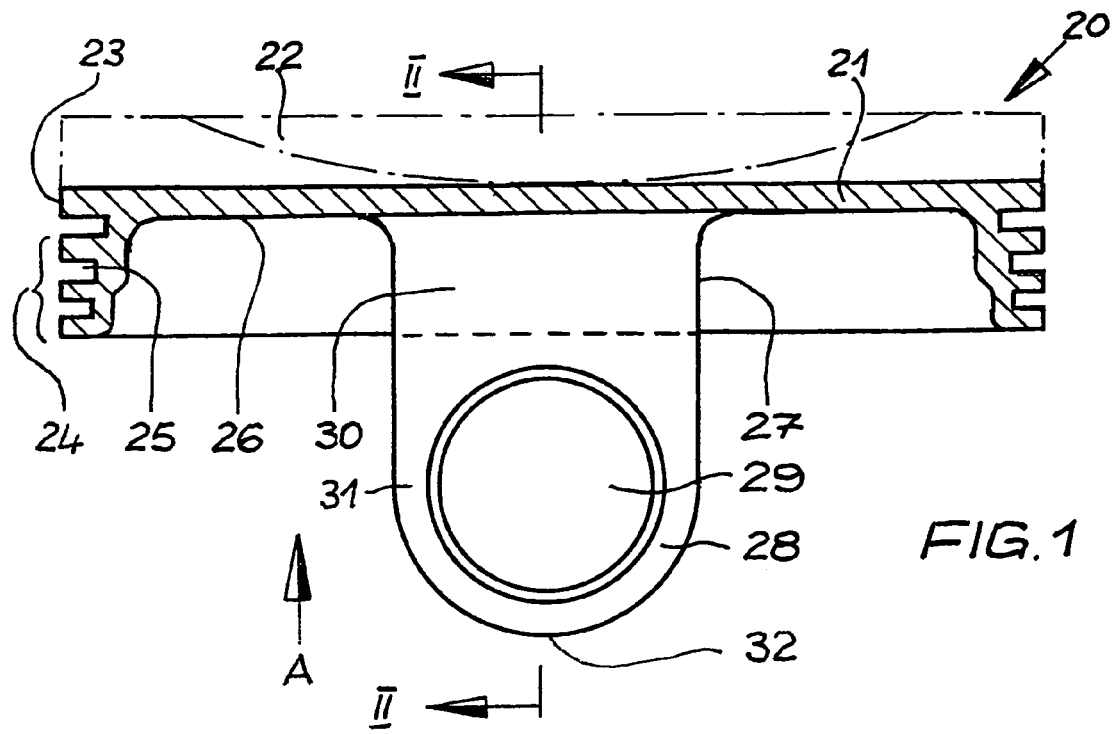
FIG. 1 shows a sectional view of an embodiment of a piston head for a piston according to the invention.
Figure 2:
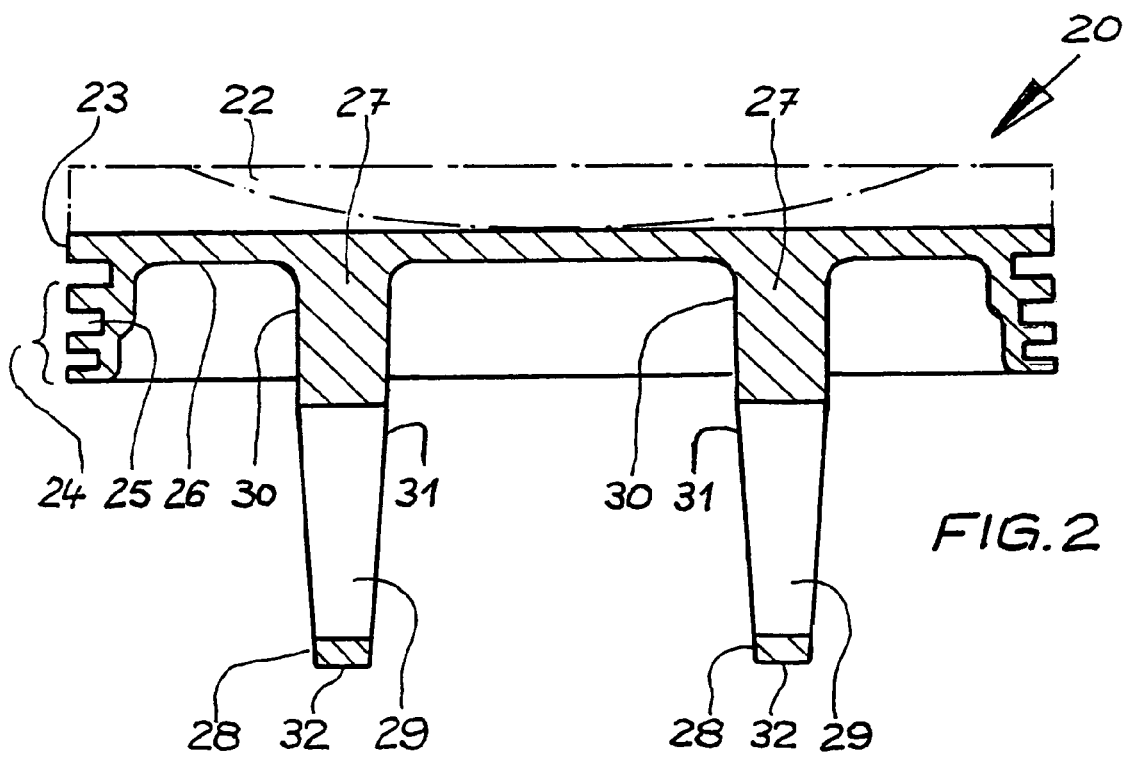
FIG. 2 shows a sectional view of the piston head of FIG. 1 along line II—II of FIG. 1.

Referring now in detail to the drawings, FIGS. 1 to 8, show an embodiment of a piston 10 according to the invention with a piston head 20 and a piston skirt 40. Piston head 20 is shown in details in FIGS. 1, 2 and 5. Piston head 20 consists of a metallic material, e.g. forged steel. It has a piston crown 21, which is flat in design, but can also feature one or more combustion recesses 22, as are familiar to the average person of skill in the art. Such a piston crown with a combustion recess 22 is shown in dotted lines in FIG. 1. Piston crown 21 turns into a cylindrical circumferential surface comprising a fire land 23 and a ring belt 24. Ring belt 24 is provided with ring grooves 25 for accommodating conventional piston rings (not shown).

Two boss lands 27 parallel to each other are fashioned on the underside 26 of piston crown 21. Boss lands 27 each turn into a head boss 28. Each head boss 28 is provided with a head boss hole 29. Head boss holes 29 are aligned flush to each other. Boss lands 27 feature side bearing surfaces 30 and head bosses 28 feature side bearing surfaces 31. In addition, head bosses 28 each feature a horizontal lower support surface 32. The side bearing surfaces 31 of each head boss 28 are tapered towards support surface 32. The side bearing surfaces 30 of boss lands 27 on the other hand run parallel to each other.

Figure 3:
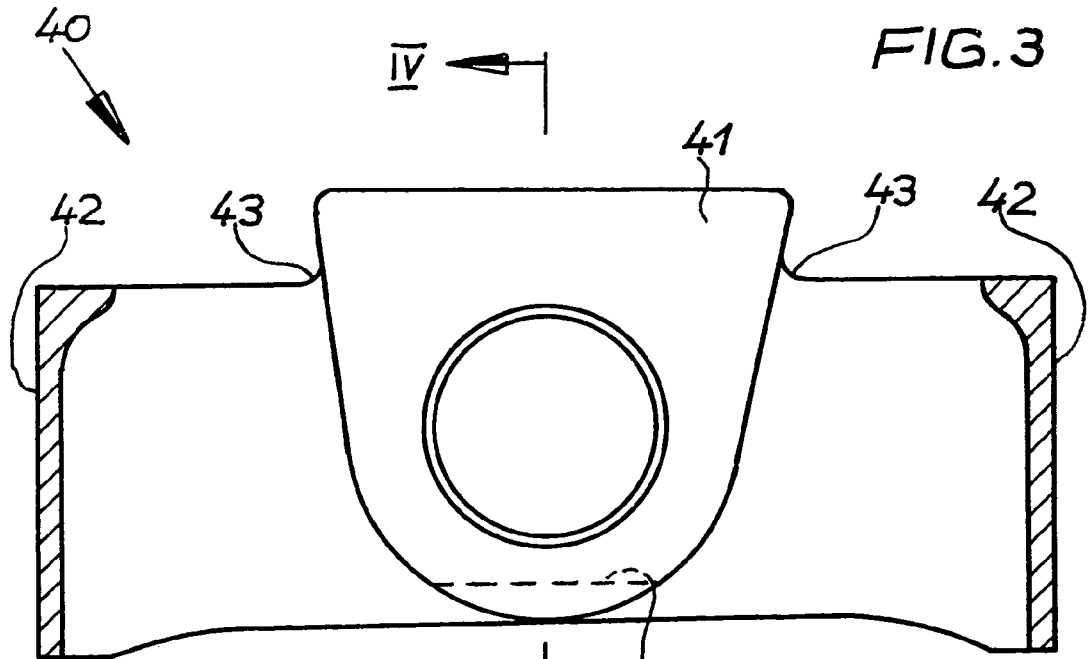
FIG. 3 shows a sectional view of an embodiment of a piston skirt for a piston according to the invention.
Figure 4:
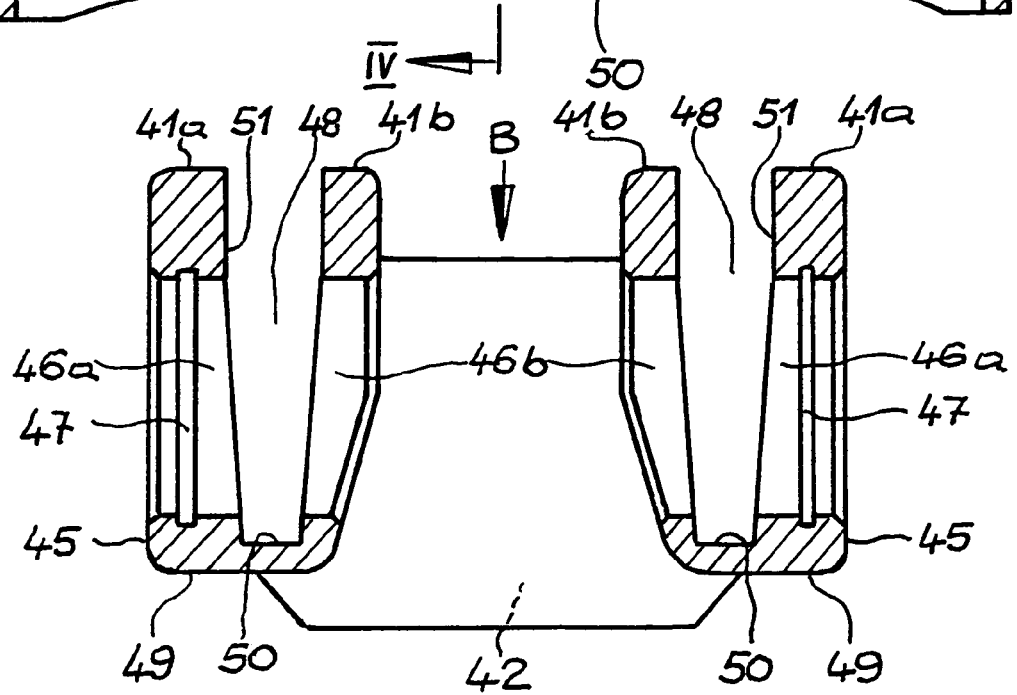
FIG. 4 shows a sectional view of the piston skirt of FIG. 3 along line IV—IV of FIG. 3.
Figure 5:
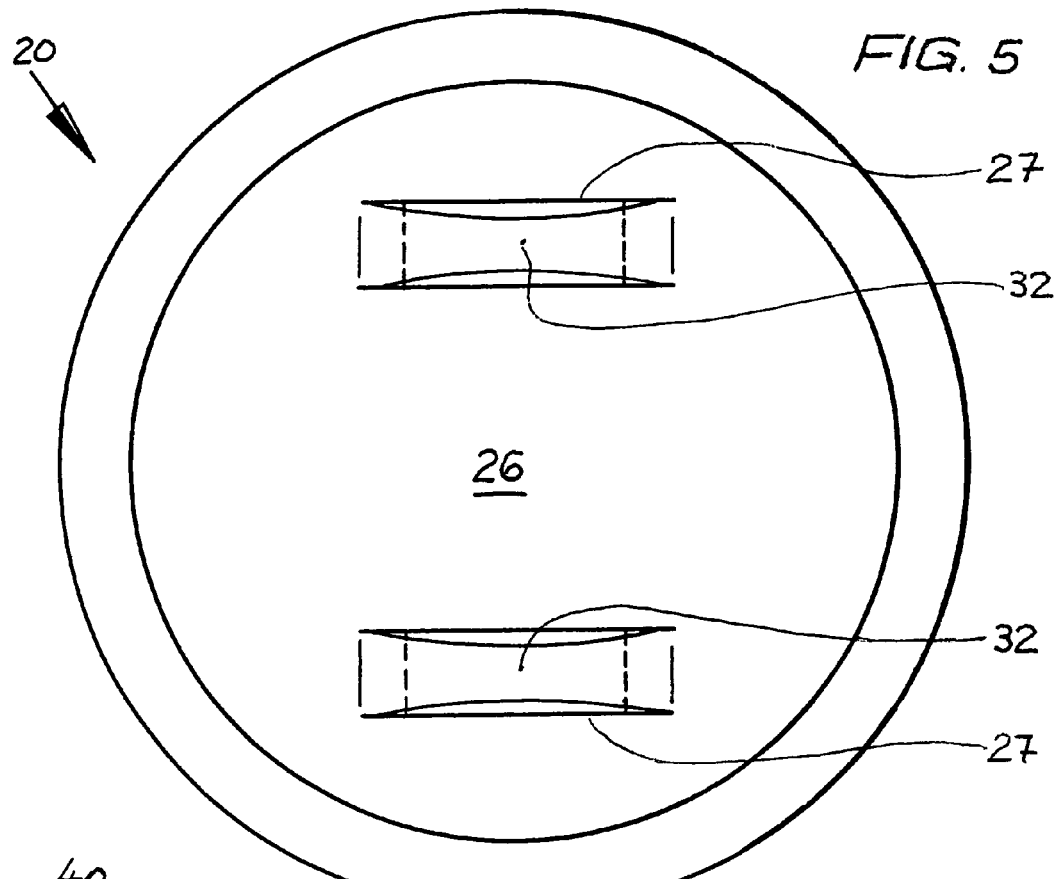
FIG. 5 shows a view from below of the piston head of FIG. 1 in the direction of arrow A in FIG. 1.
Figure 6:
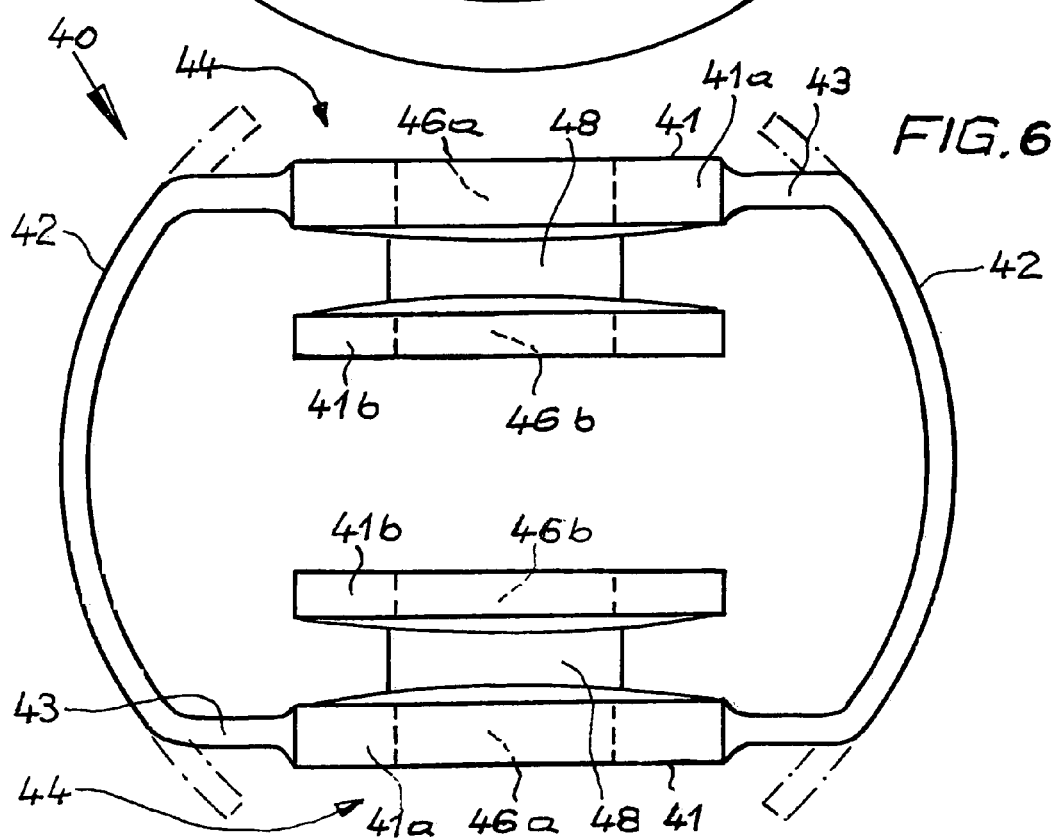
FIG. 6 shows a view from above of the piston skirt of FIG. 3 in the direction of arrow B in FIG. 4.

FIGS. 3, 4 and 6 show an embodiment of a piston skirt 40 for a piston 10 according to the invention. The partially cylindrical piston skirt 40 consists of a metallic material or an aluminum alloy. Piston skirt 40 features two boss bodies 41 and a bearing surface 42. Bearing surface 42 is essentially cylindrical in shape and joined to boss bodies 41 by way of connecting lands 43 (see FIG. 6). Bearing surface 42 of piston skirt 40 stretches over only part of the overall circumference of piston skirt 40 and features in the area of boss bodies 41 in each case a gap or recess 44, as can be prominently seen in FIG. 6. As is shown dash-dotted in FIG. 6, bearing surface 42 can also extend over connecting lands 43.

Each boss body 41 features a skirt boss 45 with a skirt boss hole 46. The skirt boss holes 46 of each piston skirt 40 are arranged flush in relation to each other. Furthermore, the area of skirt boss 45 features circlip grooves 47 for conventional circlips for limiting the axial movement of a gudgeon pin accommodated in skirt boss hole 46.

In this embodiment, each boss body 41 is provided with a recess 48, which divides boss body 41 into an outer part 41a with an other boss hole 46a and an inner part 41b with an inner boss hole 46b. Outer part 41a is thicker in this embodiment than inner part 41b, i.e. recess 48 is located off-center in boss body 41. This ensures that there is sufficient space in outer part 41a for circlip grooves 47. Recess 48 in boss body 41 creates a bridge which connects outer part 41a and inner part 41b to each other. Recess 48 ends in bridge 49 by creating a support surface 50. Furthermore, recess 48 creates on the boss body bearing surfaces 51 which taper onto support surface 50. Bearing surfaces 51 in boss body 41 correspond to bearing surfaces 30 and 31 of boss lands 27 or of head bosses 28 on piston head 20.

FIGS. 7 and 8 show piston 10 joined together out of piston head 20 and piston skirt 40. The gudgeon pin is not shown. In the joining operation head bosses 28 are inserted with boss lands 27 of piston head 20 into recesses 48 of boss bodies 41 of piston skirt 40. Head boss holes 29 and the outer and inner boss holes 46a and 46b of the piston skirt are aligned flush in relation to each other in such a way that they can accommodate the gudgeon pin (not shown). Recesses 46 are dimensioned so that head boss holes 29 are correctly positioned when support surface 32 of head boss 28 and support surface 50 of bridge 49 connecting outer part 41a and inner part 41b come to rest on each other. The parallel bearing surfaces 30 of boss lands 27 and the tapering bearing surfaces 31 of head boss 28 on the one hand and the partially parallel and partially tapering bearing surfaces 51 on boss body 41 on the other hand are dimensioned in such a way as to form a wringing fit when joined together. The advantage of this is that piston head 20 and piston skirt 40 before the gudgeon pin is installed are preassembled in their end positions and no longer have to be secured separately in their end positions.

FIG. 9 shows a further embodiment of a piston 110 according to the invention with a piston head 120 and a piston skirt 140. Piston head 120 and piston skirt 140 correspond for the most part to the piston head 20 and piston skirt 40 already described to such an extent that only the features deviating therefrom shall be explained here. The main difference lies in the fact that recess 148 is fashioned on the outside of boss body 141 of piston skirt 140, i.e. boss body 141 in this embodiment is not in two parts and boss lands 127 and head bosses 128 of piston head 120 now rest on the outside of boss body 141 of piston skirt 140. Support surface 150 is now marginally arranged on the outside of boss body 141. Recess 148 creates on boss body 141 a single bearing surface 151 which now runs vertically onto support surface 150. Accordingly, boss land 127 and head boss 128 of piston head 120 also feature a single corresponding bearing surface 130 and 131. Bearing surfaces 130 and 131 also run vertically onto the horizontal lower support surface 132 of head boss 128. Bearing surfaces 130, 131 and 151 are dimensioned in such a way that they also form a wringing fit. Circlip grooves 147 are now not provided in the area of skirt boss 145, but rather in the area of head boss 127.

FIG. 10 shows a further embodiment of a piston 210 according to the invention with a piston head 220 and a piston skirt 240. Piston head 220 and piston skirt 240 correspond for the most part to the piston head 20 and piston skirt 40 already described to such an extent that only the features deviating therefrom shall be explained here. The main difference lies in the fact that recess 248 is fashioned on the inside of boss body 241 of piston skirt 240, i.e. boss body 241 in this embodiment is not in two parts, and boss lands 227 and head bosses 228 of piston head 220 now rest on the inside of boss body 241 of piston skirt 240. Support surface 250 is now marginally arranged on the inside of boss body 241. Recess 248 creates on boss body 241 a single bearing surface 251 which now runs vertically onto support surface 250. Accordingly, boss land 227 and head boss 228 of piston head 220 also feature a single corresponding bearing surface 230 and 231. Bearing surfaces 230 and 231 also run vertically onto the horizontal lower support surface 232 of head boss 228. Bearing surfaces 230, 231 and 251 are dimensioned in such a way that they also form a wringing fit. Circlip grooves 247 are provided in this embodiment in the area of skirt boss 245 of boss body 241.

Accordingly, while only a few embodiments of the present invention have been shown and described, it is obvious that many changes and modifications may be made thereunto without departing from the spirit and scope of the invention.

What is claimed is:

1. A two-part piston for an internal combustion engine, comprising:
   a piston head comprising a piston crown, two bosses connected to an underside of the piston crown, each boss having a boss land, a head boss and a head boss hole; and
   a piston skirt connected to the piston head, the piston skirt having at least two boss bodies, each boss body having a skirt boss, a skirt boss hole, and a recess for accommodating a corresponding boss land,
   such that when said piston head and piston skirt are joined, said head boss holes and skirt boss holes are flush relative to each other to accommodate a gudgeon pin, wherein the boss land and head boss each feature at least one tapered bearing surface that faces a tapered bearing surface in the recess of a corresponding boss body.

2. A piston according to claim 1, wherein each head boss has a support surface that rests on a support surface of the recess of a corresponding boss body.

3. A piston according to claim 1, wherein the piston skirt has a bearing surface that has a recess located at a height of each skirt boss hole.

4. A two-part piston for an internal combustion engine, comprising:
- a piston head having a piston crown, two bosses connected to an underside of the piston crown, each boss having a boss land, a head boss and a head boss hole; and
- a piston skirt having two boss bodies, each boss body having a skirt boss, a skirt boss hole and a recess on an inner side or outer side of the boss body, said recess accommodating a corresponding boss land with the associated head boss when the piston head is joined to the piston skirt,
- so that the head boss holes and skirt boss holes are aligned flush relative to each other for accommodating a gudgeon pin.

5. A piston according to claim 4, wherein each boss land, head boss and recess of the corresponding boss body are dimensioned so that when joined, the boss land, head boss and boss body are held together and hold the piston head and piston skirt in position prior to installation of the gudgeon pin.

6. A piston according to claim 5, wherein said boss land and head boss feature at least one bearing surface that faces a bearing surface on the recess in a corresponding boss body.

7. A piston according to claim 6, wherein said bearing surfaces are aligned vertically and parallel in relation to each other.

8. A piston according to claim 4, wherein each head boss has a support surface that rests on a support surface of the recess of a corresponding boss body.

9. A piston according to claim 4, wherein the piston skirt has a recess disposed at a height of each skirt boss hole.

10. A two-part piston for an internal combustion engine, comprising:
- a piston head having a piston crown and two bosses disposed on an underside of the piston crown, each boss having a boss land, a head boss and a head boss hole; and
- a piston skirt having two boss bodies, each boss body having a skirt boss and a recess, by means of which recess an outer part with an outer boss hole and an inner part with an inner boss hole are formed, the outer part and inner part being connected to each other at their ends turned away from the piston head by way of a bridge;
- wherein when the piston head is joined to the piston skirt, the boss land and associated head boss is accommodated between the outer part and the inner part of the corresponding boss body, so that the head boss hole and the outer and inner boss holes are aligned flush relative to each other for accommodating a gudgeon pin.

11. A piston according to claim 10, wherein the boss land, head boss and recess of the corresponding boss body are dimensioned in such a way that, when joined, the boss land, head boss and boss body are held together and hold the piston head and piston skirt in position prior to installation of the gudgeon pin.

12. A piston according to claim 11, wherein the boss land and head boss each feature at least one tapering bearing surface that faces at least one tapering bearing surface on the recess in the corresponding boss body.

13. A piston according to claim 10, wherein each head boss has a support surface that rests on a support surface of the recess of the corresponding boss body.

14. A piston according to claim 10, wherein the outer part and inner part have different thicknesses in a direction of their outer and inner boss holes.

15. A piston according to claim 10, wherein the piston skirt has a bearing surface that has a recess at a height of each skirt boss hole.

* * * * *